(12) United States Patent
Wang (10) Patent No.: US 7,077,749 B1
(45) Date of Patent: Jul. 18, 2006

(54) DYNAMIC WEATHER SIMULATION

(75) Inventor: Niniane Wang, Santa Clara, CA (US)

(73) Assignee: Microsoft Corporation, Redmond, WA (US)

( * ) Notice: Subject to any disclaimer, the term of this patent is extended or adjusted under 35 U.S.C. 154(b) by 332 days.

(21) Appl. No.: 10/716,701

(22) Filed: Nov. 20, 2003

(51) Int. Cl.
  *A63F 13/00* (2006.01)

(52) U.S. Cl. ............................ 463/32; 463/30; 463/31

(58) Field of Classification Search ............ 463/30–34; 434/29, 30, 38, 49, 69
See application file for complete search history.

(56) References Cited

U.S. PATENT DOCUMENTS

| | | | | |
|---|---|---|---|---|
| 5,363,475 | A | * | 11/1994 | Baker et al. ................. 345/422 |
| 5,926,401 | A | * | 7/1999 | Montag et al. ................. 703/5 |
| 6,184,897 | B1 | | 2/2001 | Gueziec et al. |
| 6,639,591 | B1 | * | 10/2003 | Shoji et al. .................. 345/418 |

OTHER PUBLICATIONS

J. Berssenbrügge, et al., "Real-Time Representation Of Complex Lighting Data In A Nightdrive Simulation", The European Association 2003, pp. 65-70.
Lloyd A. Treinish, "Multi-Resolution Visualization Techniques For Nested Weather Models", IBM Thomas J. Watson Research Center, pp. 513-517.
Lloyd A. Treinish, "Task-Specific Visualization Design: A Case Study In Operational Weather Forecasting", IBM Thomas J. Watson Research Center, 1998, pp. 405-409.
Lloyd A. Treinish, "Visual Data Fusion For Applications Of High-Resolution Numerical Weather Prediction", IBM Thomas J. Watson Research Center, pp. 477-481.
F. Altobelli, et al., "Emergency Medical System Networked Simulation", SCAMC, Inc., 1989, pp. 999-1000.
Bryce M. Hand, et al., "Computer Simulation In Introductory Geology", Computers & Geosciences, vol. 2, 1976.
Mike Harrington, "Controlling Motion-Tracking Devices", Dr. Dobb's Journal, Mar. 1999, pp. 90-96.

(Continued)

*Primary Examiner*—John M. Hotaling, II
(74) *Attorney, Agent, or Firm*—Banner & Witcoff, Ltd.

(57) ABSTRACT

Methods and systems for providing dynamic weather simulation in a computer gaming environment are disclosed. Weather may be user-specified, computer simulated, or based on periodic updates of real-world weather conditions. To dynamically simulate weather while conserving computer resources, a weather simulation manager may periodically alter temperature and dew point values and determine whether to render or dissipate clouds based on the current temperature and dew point values. Weather may be morphed back to real-world weather as updated weather is retrieved from a database over the Internet. The weather simulation manager may simulate weather independently for each of a plurality of geographic cells, thus allowing different weather to appear in different directions during game play. Cloud dissipation may be based on increasing a transparency value of sprites located at the outer edges of each cloud, and gradually working towards the center of the cloud until the cloud has disappeared completely.

24 Claims, 7 Drawing Sheets

OTHER PUBLICATIONS

Frank C. Harris, et al., "Road Construction—Simulation Game For Site Managers", Journal Of The Construction Division, Sep. 1977, pp. 405-414.

The Gold Guide @ Gone Gold, printed from http://www.gonegold.com/gguide/index2.shtml on Nov. 20, 2003, 4 pages.

simMarket.com, Flight Simulation Super Store, printed from http://secure.simmarket.com/ on Nov. 20, 2003, 2 pages.

The X-Plane Flight Simulator Community, printed from http://www.x-plane.org/ on Nov. 20, 2003, 2 pages.

AVISM Online Main page, printed from www.avsim.com/pages/main_page.shtml on Nov. 7, 2003, 7 pages.

"War Games At The War College On Personal Computers", Journal: Defense Electronics, Apr. 1984, vol. 16, No. 4, pp. 134-136.

* cited by examiner

DYNAMIC WEATHER SIMULATION

FIELD OF THE INVENTION

The invention relates generally to weather simulation. More specifically, the invention provides pseudo-realistic weather simulation to a computer user while not over-taxing computer resources, thereby providing realistic simulated weather on a general-purpose computer system.

BACKGROUND OF THE INVENTION

Weather simulation is a difficult process, evidenced by the rate with which weather forecasters and meteorologists provide incorrect weather forecasts. "Real world" weather simulation is a computationally expensive process due to the required 3-dimensional modeling of airflow, temperature, precipitation, and the like. Advanced weather simulation machines are generally comprised of supercomputers and high-end graphics workstations, above the price range of an ordinary consumer, and overkill for use in most computer and/or video games.

Due to the extensive advanced weather simulation requirements, present general purpose computers are not suited to perform advanced weather simulations. Advanced weather simulation on a general purpose computer, if possible, would consume all or a significant portion of the computer's resources during the simulation, leaving significantly less resources for other processes running on the computer.

Some computer programs in the simulation genre, however, depend on weather simulation to provide a realistic virtual world in which the simulation takes part. For example, some flight simulation games depend in part on the weather in which the user is flying to determine whether the user should fly under Visual Flight Rules (VFR) or Instrument Flight Rules (IFR). Whether a user is flying VFR or IFR will affect the user's actions, including instrument manipulation and communications with air traffic control (ATC). Some war simulation games and training software depend in part on weather to determine how far a player can see in the virtual world being simulated, which may affect military strategy. War simulation games may also depend on simulated precipitation when determining the range of launched projectiles (e.g., catapults, trebuchets, cannonballs, mortars, arrows and other non-propelled missiles, and the like).

Simulation games presently provide only a limited amount of weather simulation due to the large amounts of computer resources (e.g., processor time and memory) required to effectively simulate weather. For example, some known flight simulation games simulate only one weather type at a time. While weather can be different in different areas of the virtual world in which the user is flying, the weather will appear only of a single type at any given time. More specifically, if the user is flying in overcast skies with a ceiling of 4,000 feet, the virtual world will appear overcast with a ceiling of 4,000 feet in all directions from the user's present location. If the user subsequently flies into mostly sunny skies, the weather might change to mostly sunny skies, but it will do so in all directions. That is, even if the user looks behind his or her plane, the user will only see mostly sunny skies. The user will not see the overcast skies from which the user supposedly flew.

In attempts to make simulation games more real, some simulations games allow limited download of actual weather conditions for use during game play by downloading actual weather conditions prior to the start of a game, and subsequently using the downloaded weather conditions for the duration of the game. While this provides limited realism, it does not alleviate the problem where weather appears the same in all directions, nor does it provide changing and/or continuously real weather during the game.

Thus, it would be an advancement in the art to provide improved realism in weather simulation, including cloud formation and temperature changes, whereby multiple types of weather can be simulated at the same time, and whereby the weather simulation is suitable for presentation on a general purpose computer system without over burdening the computer system such that the computer cannot perform other tasks. It would be a further advancement in the art to provide continuously updated real world weather throughout the duration of game play.

BRIEF SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

To overcome limitations in the prior art described above, and to overcome other limitations that will be apparent upon reading and understanding the present specification, the present invention is directed to simulating weather in a computer game. According to an aspect of the invention, upon starting a game play portion of a computer game, a weather simulation manager receives meteorological conditions for a specified geographic area, and alters cloud formations based on the received meteorological conditions. The weather simulation manager repeats the receiving and altering steps in intervals during the game play portion of the computer game.

According to another aspect of the invention, the weather simulation manager may alter cloud formations in the computer game based on temperature and/or dew point. The weather simulation manager determines a temperature and a dew point. The weather simulation manager then generates a random number and, when the random number is within a determined probability of cloud formation based at least in part on a spread of the temperature and dew point, the weather simulation manager renders a cloud on a display screen during a game play mode of the computer game.

According to another aspect of the invention, during weather simulation, the weather simulation manager dissipates a rendered cloud in a virtual environment simulated in a computer game by gradually increasing a transparency level at edges of the cloud, and iteratively increasing a transparency level closer to a center of the cloud as farther out portions of the cloud fade from view due to their increased transparency level.

According to another aspect of the invention, a weather simulation manager may render clouds in a simulated environment during a game play portion of a computer game by rendering clouds based at least in part on actual temperature, dew point, and/or pressure data received during the game play portion of the computer game. The actual temperature, dew point, and/or pressure data preferably correspond to a user's current geographical position in the simulated environment of the computer game.

According to another aspect of the invention, a weather simulation manager may separately simulate weather for each of a plurality of predetermined areas by dividing a simulated geographic environment into a plurality of areas, and simultaneously depicting on a display, simulated weather conditions for each of a first and second area that are visible from a user's simulated position in the simulated geographic environment, wherein the depiction of the simulated weather conditions for the first area is different that the depiction of the simulated weather conditions for the second area.

According to other aspects of the invention, a weather simulation manager may simulate weather in a computer game by graphically depicting clouds based at least in part on temperature, dew point, and/or pressure data.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Illustrative Operating Environment

Figure 1:
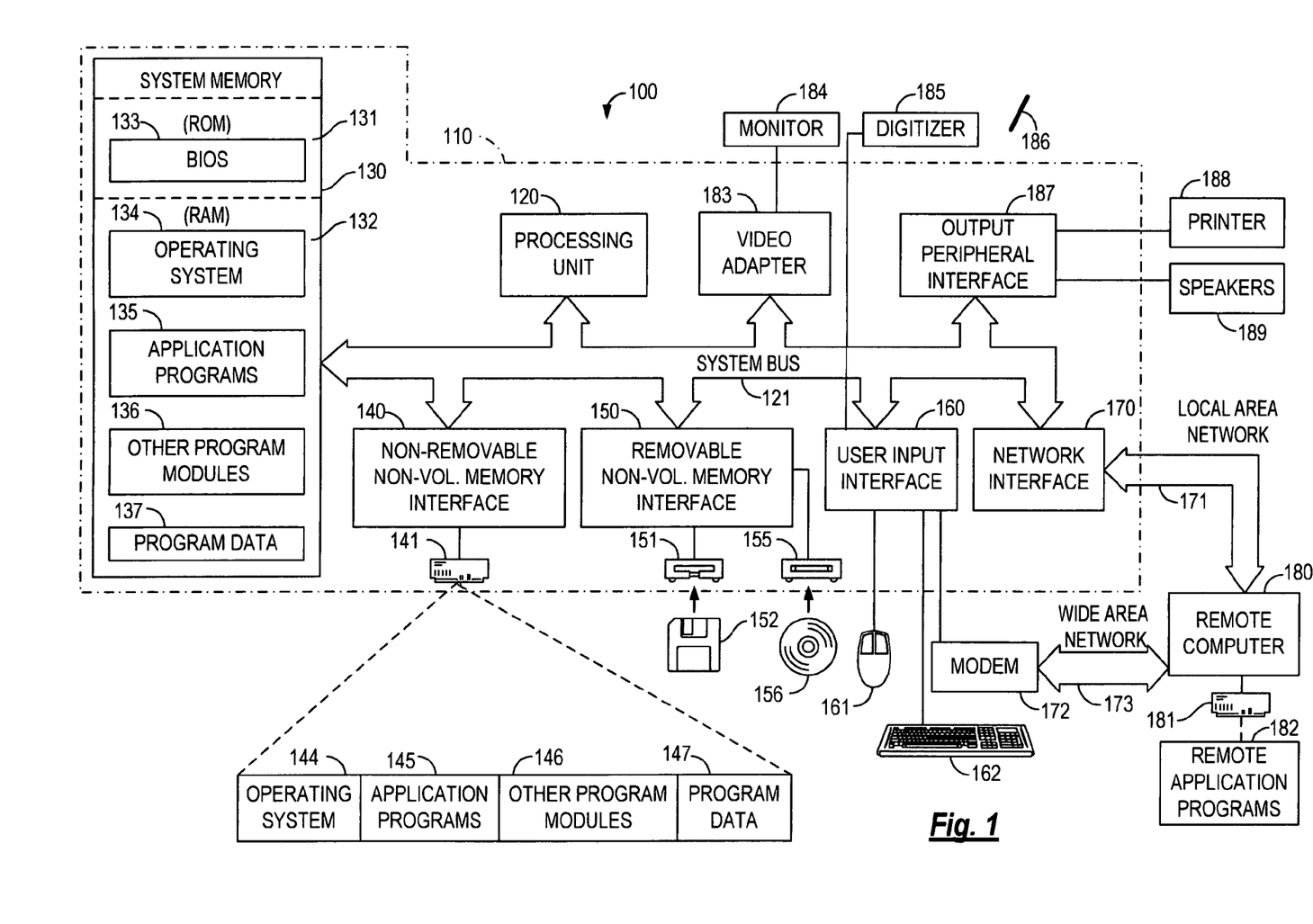
FIG. 1 illustrates a general operating environment suitable for one or more aspects of an illustrative embodiment of the invention.

FIG. 1 illustrates an example of a suitable general purpose computing system environment 100 on which dynamic weather may be simulated. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers; server computers; portable and hand-held devices such as personal digital assistants (PDAs), tablet PCs or laptop PCs; multiprocessor systems; microprocessor-based systems; set top boxes; programmable consumer electronics; network PCs; minicomputers; mainframe computers; distributed computing environments that include any of the above systems or devices; and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an illustrative system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Advanced Graphics Port (AGP) bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 184 or other type of display device is also connected to the system bus 121 via an interface, such as a video interface 183. Computer 110 may also include a digitizer 185 for use in conjunction with monitor 184 to allow a user to provide input using a stylus input device 186. In addition to the monitor, computers may also include other peripheral output devices such as speakers 189 and printer 188, which may be connected through an output peripheral interface 187.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 182 as residing on memory device 181. It will be appreciated that the network connections shown are exemplary and other means of establishing a communications link between the computers may be used.

Illustrative Embodiments of the Invention

One or more aspects of the invention may be embodied in computer-executable instructions (i.e., software), such as in a weather simulation software object, routine or function (collectively referred to herein as a weather simulation manager) stored in system memory 130 or non-volatile memory 141, 152, 156 as application programs 135, 145, program modules 136, 146, and/or program data 137, 147. The software may alternatively be stored remotely, such as on remote computer 180 with remote application programs 182. Generally, program modules include routines, programs, objects, components, data structures, etc. that perform particular tasks or implement particular abstract data types when executed by a processor in a computer or other device. The computer executable instructions may be stored on a computer readable medium such as a hard disk 141, optical disk 156, removable storage media 152, solid state memory, RAM 132, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

The weather simulation manager may be a component of a larger application program, such as a computer game that simulates weather as part of the gaming environment. Examples of such games may include, but are not limited to, flight simulation games, war simulations games, or any other game that takes place in a simulated virtual world. The larger application program might also be a computer based training application that trains users in a simulated real-world environment, or it may be any application program that simulates a virtual environment that relies in part on weather. The larger application program of which the weather simulation manager is a part may be referred to herein as the control program. As used herein, the term "computer game" refers to any game played on a personal computer, handheld computer, personal digital assistant, mobile phone, video game console, arcade game unit, and/or played on any other data processing device.

Figure 2:
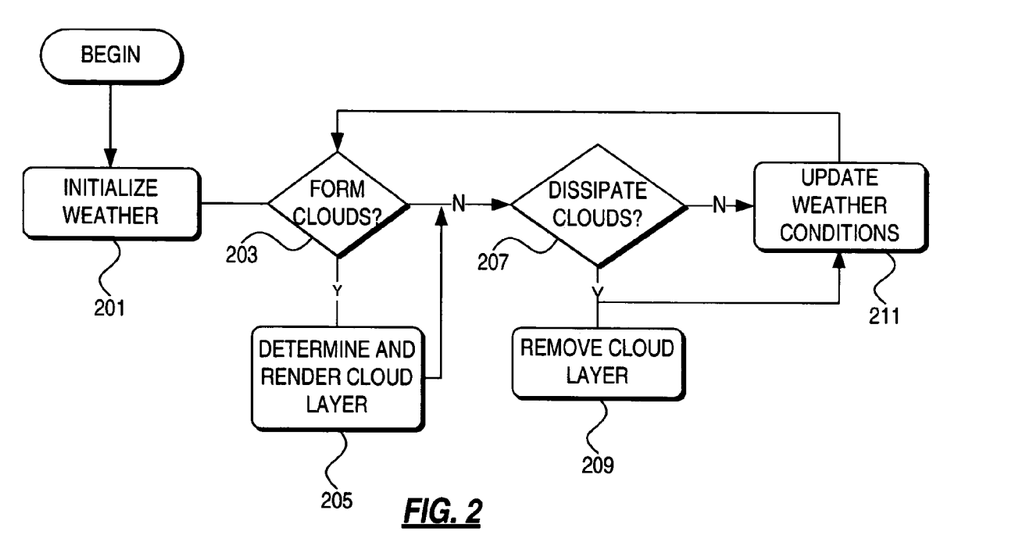
FIG. 2 illustrates a general method for dynamically simulating weather according to an illustrative embodiment of the invention.

With reference to FIG. 2, aspects of the invention may include a method for dynamic weather simulation. In step 201, the weather simulation manager initializes the weather, e.g., by obtaining or determining initial values for temperature and dew point for each of various regions in a simulated geographical environment (discussed in detail below). Next, in step 203, the weather simulation manager determines whether clouds should form in each region. If clouds should form in a region, the weather simulation manager causes the computer system to graphically depict, also referred to as render, a layer of clouds in that region, in step 205. Next, in step 207, the weather simulation manager determines, for each of the various regions, whether each existing cloud layer should dissipate. If so, in step 209, the weather simulation manager causes the computer system to dissipate the cloud layer determined to dissipate in step 207. In step 211, the weather simulation manager updates the weather conditions, e.g., including temperature and dew point, and returns to step 203. Each of these general steps will now be described in more detail.

Figure 3:
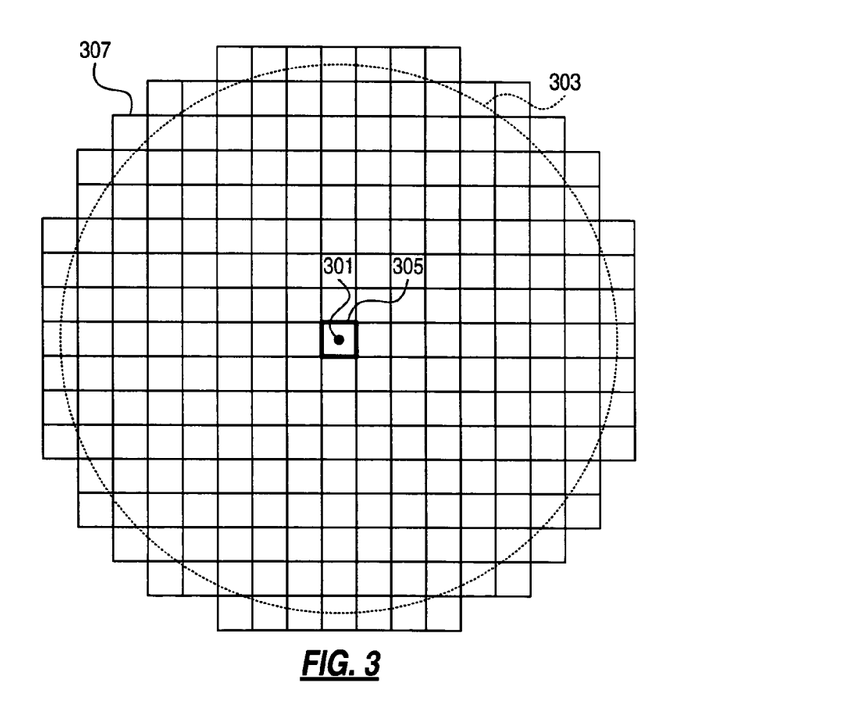
FIG. 3 illustrates a geographic cell grid that may be used to independently simulate weather over a geographic area according to an illustrative embodiment of the invention.

With reference to FIG. 3, the weather simulation manager may independently simulate weather using the method of FIG. 2 (as further described in detail below) for each of a plurality of cells 305 in a geographical grid 307. Each cell 305 of the grid 307 corresponds to a predetermined geographic area within the simulated virtual environment. Because the user typically cannot see every location in the simulated environment at the same time, the weather simulation manager might only simulate weather for those cells located adjacent to, within a predetermined distance of, or within a predetermined radius of the user's current position 301 or current cell 305. In an illustrative embodiment, each cell 305 may be a simulated 16 km×16 km area, extending away from the user in an approximately circular region 303 for a radius of 128 km. As the user moves within the simulated environment, cells may be added and removed from the set of cells for which weather simulation is performed as the cells come within and move beyond the predetermined distance, respectively. The cell sizes and predetermined distance may be increased or decreased, depending on the simulated visibility, performance capabilities of the computer system on which the weather simulation manager is running, and simulation regions other than circles may be used (e.g., rectangular, ellipse, triangular etc.).

In order to ensure that weather simulation does not affect other control program functions or other application programs running on the same computer system, the weather simulation manager may be allotted a predetermined amount of computer resources in which to perform weather simulation functions. In addition, the weather simulation manager might only perform weather simulation calculations for any given cell once within a predetermined amount of time, e.g., no more than once every ten seconds.

In an illustrative embodiment of the invention, the control program may allot the weather simulation manager a time slice, e.g., a fiber, every animation frame (preferably running at 30 frames per second or higher) in which the weather simulation manager can perform weather simulation functions. The weather simulation manager performs weather simulation calculations as described herein for as many cells within the region 303 as possible during each time slice. When the time slice is over, the weather simulation manager waits for the next allotted time slice and continues with the next cell in the region 303. Prior to performing weather simulation calculations for a cell, the weather simulation manager may check to see if the current cell has had weather simulation calculations performed within a predetermined amount of time (e.g., 10 seconds in this example) and, if so, skips the cell. Those of skill in the art will appreciate that any time slice allotment may be used, e.g., based on fibers, threads, time, and the like, and any predetermined amount of time, including zero, may be used as the delay for weather simulation calculations for each cell.

Because the weather simulation manager performs weather calculations for each cell seaparately, different weather may be simulated in neighboring cells. This provides an increased sense of realism to the user because the weather simulation manager more closely mimics real world weather. That is, a user facing one direction might see mostly sunny skies and no rain, whereas if the user looks in the opposite direction in the simulated environment the user might see overcast skies and rain.

The control program (e.g., a flight simulation game) may be divided into phases. In a setup phase, a user may set parameters which may be used to control a subsequent game play phase. With reference back to FIG. 2, in step 201 the control program and/or weather simulation manager, during the setup phase or at the very beginning of a game play phase, initializes current weather conditions for each cell in the virtual environment. The weather simulation manager initializes weather conditions for cells within the predetermined distance 303 of the user's starting position 301, and may also initialize global weather conditions outside that predetermined distance. Other ranges of cells for which weather conditions are initialized may alternatively be used. For each cell for which weather conditions are initialized, initial weather conditions may include surface conditions and winds aloft. Surface conditions may include, but are not limited to, temperature, dew point, wind speed, wind shear, wind turbulence and wind direction, cloud coverage (e.g., 0, ⅛, ⅔, . . . , ⅝; tenths may alternatively be used), cloud ceiling or base altitude, cloud height, cloud type, cloud turbulence, cloud icing, and atmospheric pressure. Winds aloft may include, but is not limited to, wind speed, wind direction, and temperature at altitudes from 3,000 feet up to 39,000 feet.

Weather initialization may be based on various sources. In one embodiment of the invention, with reference to FIGS. 6–11, the user may select a starting weather theme 603 from a weather menu 601. The control program may have a default weather theme. For example, in FIG. 6, if the user selects or the default weather is the "fair weather" theme 605, the weather might be initialized to 59 degrees Fahrenheit, ⅛ cloud coverage at 6,000 feet with a cloud height of 1,000 feet, and no surface wind.

Figure 6:
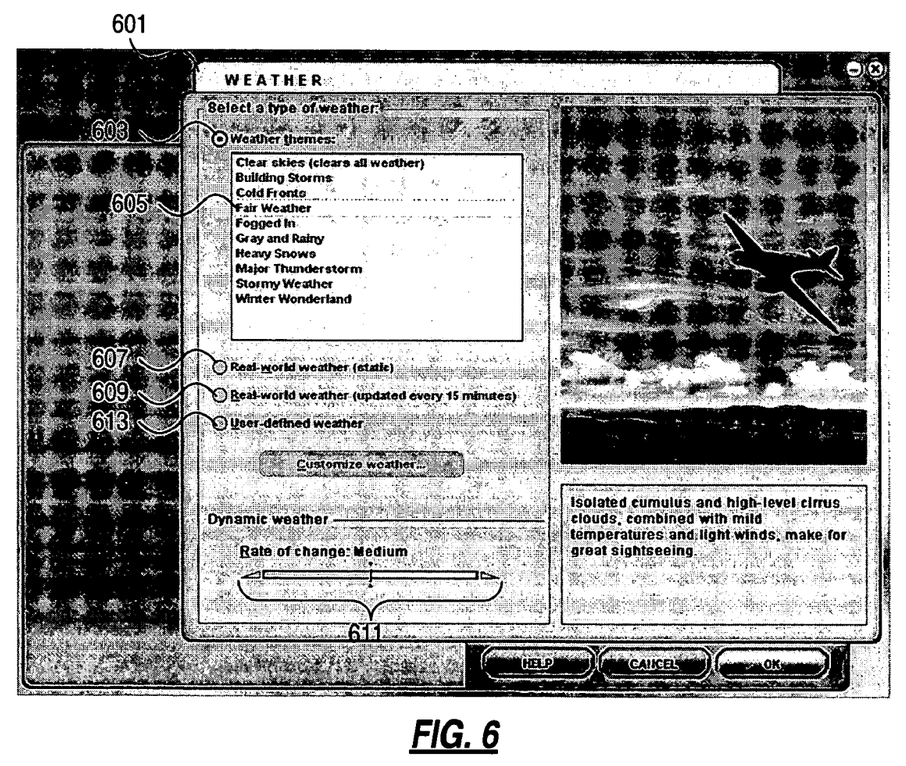
FIG. 6 illustrates a weather initialization menu according to an illustrative embodiment of the invention.

Alternatively, when a user selects Real-world weather 607 or 609, weather may be based in whole or in part on actual weather. When the simulated environment is a simulation of actually occurring geography (e.g., the United States or elsewhere on Earth), the weather simulation manager may download current weather conditions from a remote database 182 (FIG. 1) over the Internet 173 or some other network 171. For example, the weather simulation manager may download surface weather conditions as METeorological Aerodrome Reports (METARs) provided by weather stations (other meteorological data providing reports may alternatively be used). METARs may be retrieved from Jeppesen Sanderson, Inc. of Denver, Colo. Alternatively, METARs may be retrieved from the National Weather Service. METARs are known in the art, and are available for approximately 6,000 weather stations in the world, approximately half of which are in the United States. For cells in which a METAR producing weather station is located, the weather simulation manager may use the data from that METAR producing weather station for that cell. For cells in which there is not a METAR producing weather station, the weather simulation manager may interpolate between METAR producing weather stations to arrive at the initial weather conditions for those cells.

If the user selects static Real-world weather 607, the weather simulation manager might download current weather conditions once prior to beginning game play, and subsequent weather changes are as described below (not based on real weather). Alternatively, if the user selects auto-updated Real-world weather 609, the weather simulation manager might download current weather conditions prior to beginning game play, and download subsequent weather changes periodically during game play, e.g., every 15 minutes. The weather may transition gradually to the newly downloaded weather over several minutes, rather than jumping abruptly to the new weather, as further described below. Weather may or may not change in-between real weather download intervals.

Figure 7:
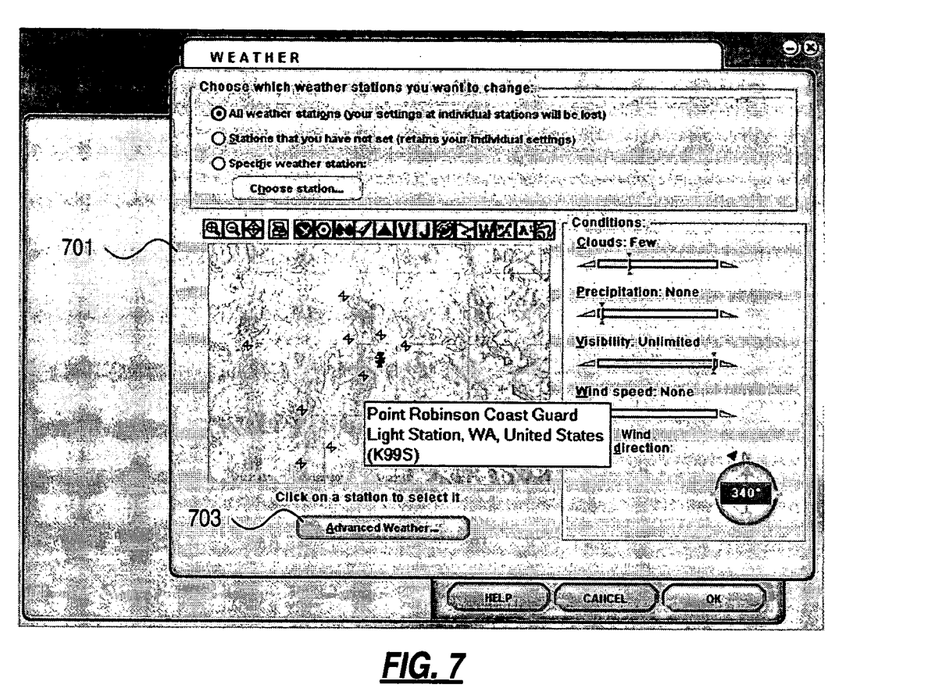
FIG. 7 illustrates a customized weather menu according to an illustrative embodiment of the invention.

The user may alternatively select User-defined weather 613, which may launch a custom weather menu 701, illustrated in FIG. 7. Custom weather menu allows the user to change general weather conditions for any or all weather stations for which weather METARs may be received. The user may select an advanced weather option 703 to change more specific weather conditions.

Figure 8:
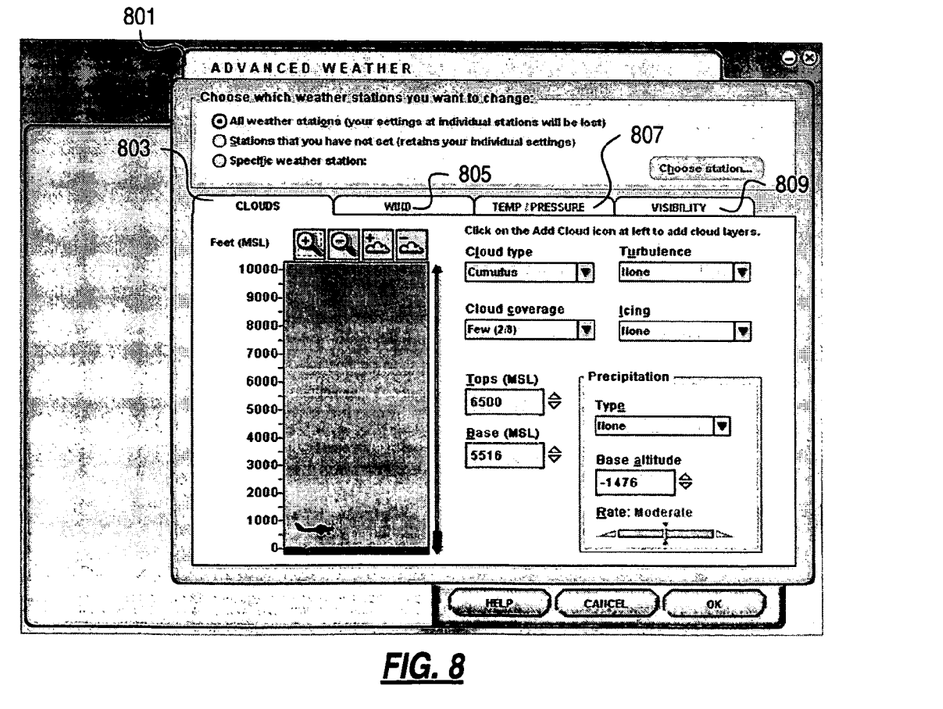
FIG. 8 illustrates an advanced weather menu and a cloud submenu according to an illustrative embodiment of the invention.
Figure 9:
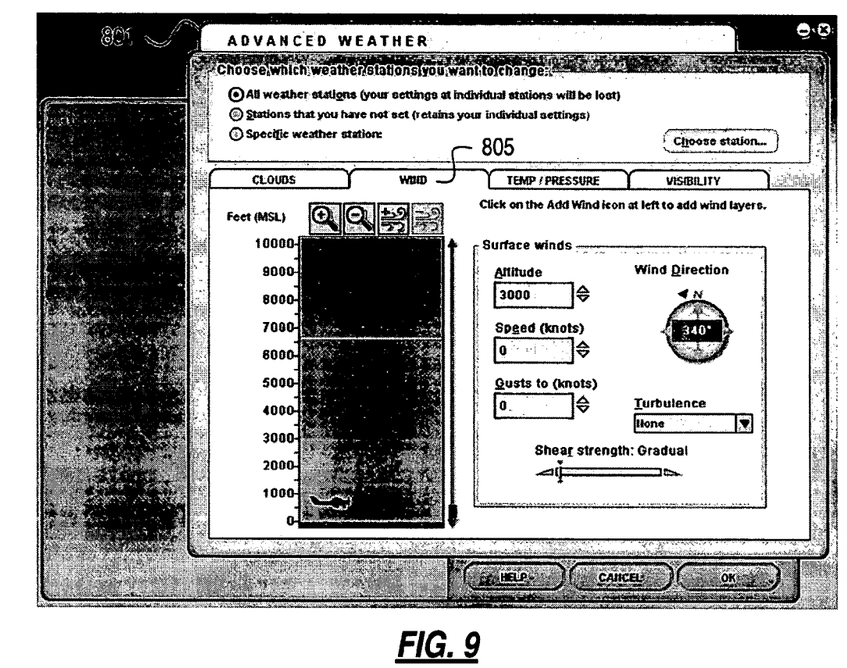
FIG. 9 illustrates an advanced weather menu and a wind submenu according to an illustrative embodiment of the invention.
Figure 10:
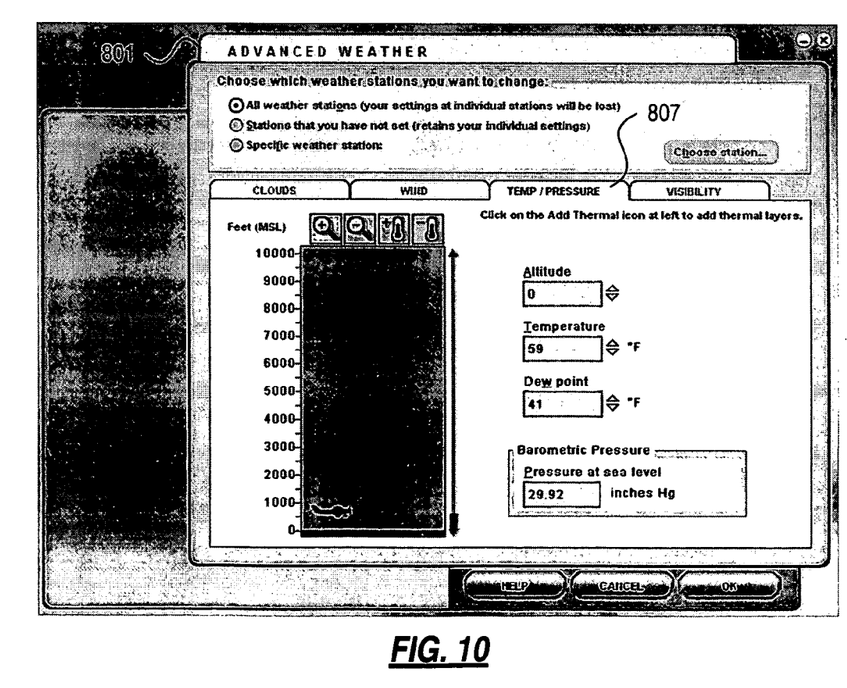
FIG. 10 illustrates an advanced weather menu and a temperature/pressure submenu according to an illustrative embodiment of the invention.
Figure 11:
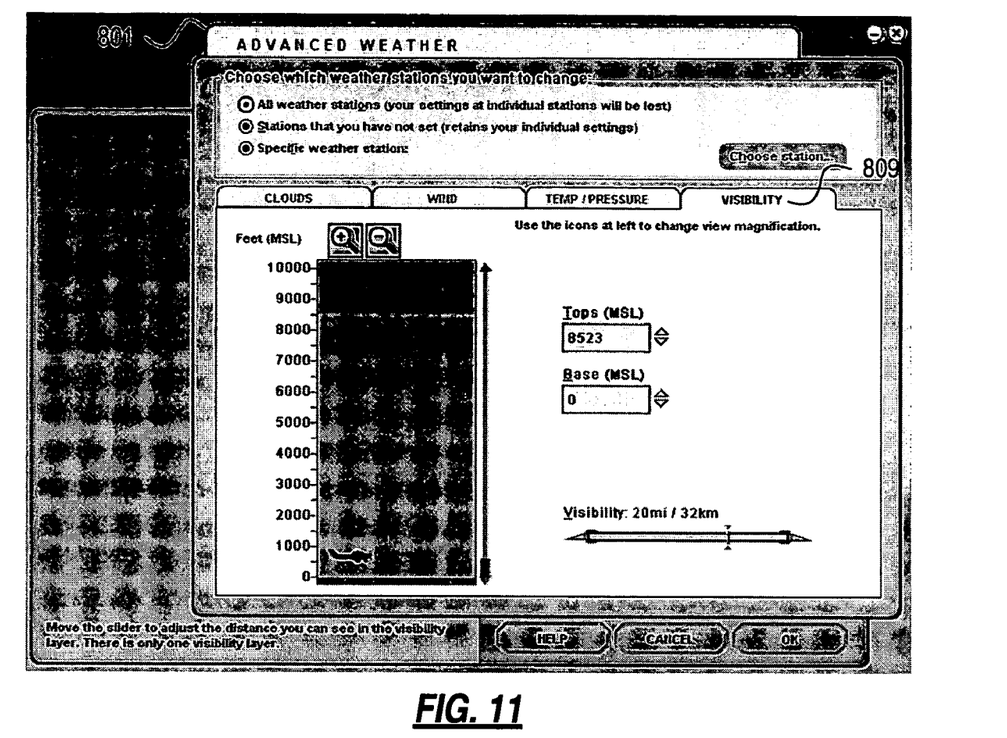
FIG. 11 illustrates an advanced weather menu and a visibility submenu according to an illustrative embodiment of the invention.

Upon selection of advanced weather option 703, the control program or weather simulation manager launches an advanced weather menu 801, illustrated in FIG. 8, where the user can change specific weather conditions, including clouds, wind, temperature/pressure, and visibility, for any or all of weather stations for which weather METARs may be received. Each of clouds, wind, temperature/pressure, and visibility may have a sub-menu or tab 803, 805, 807, 809, respectively, through which the user can edit specific details for each respective condition. FIG. 8 illustrates the advanced weather menu 801 and cloud sub-menu 803, through which the user may be able to specify meteorological conditions for cloud type, cloud coverage, cloud tops, cloud base, turbulence, icing, and precipiation. FIG. 9 illustrates the advanced weather menu and wind submenu 805, through which the user may be able to specify meteorological conditions for wind altitude, wind speed, wind gusts, wind turbulence, shear strength, and wind direction. FIG. 10 illustrates the advanced weather menu and temperature/pressure submenu 807, through which the user may be able to specify meteorological conditions for altitude and dew point for various altitudes, as well as barometric pressure at sea level. FIG. 11 illustrates the advanced weather menu and visibility submenu 809, through which the user may be able to specify meteorological conditions for visibility at various altitudes. Within each submenu, the user may specify and/or modify weather conditions on a per weather station basis and/or for each of various altitudes, thus providing user-specified weather in three dimensions.

After initialization, the weather simulation manager begins weather simulation in step 203 by determining whether clouds should form in each cell within the predetermined distance of the user's current (starting) position. As indicated above, the weather simulation manager performs weather calculations for each cell separately (one of skill in the art will appreciate that weather for one cell may be based in part on weather in another cell, e.g., when the weather simulation manager interpolates a current cell's weather based on one or more weather stations located in one or more nearby cells). The method will be described with respect to a single cell, and those of skill in the art will appreciate that the same methods may be performed for each cell as applicable.

To determine if clouds should form in step 203, the weather simulation manager first determines a cloud formation probability for the cell. The cloud formation probability may vary depending on the spread between the temperature T and dew point DP (referred to herein as the T/DP spread). Because cloud formation is checked relatively often (e.g., once every ten seconds in the above example), the cloud formation probability is preferably low so that cloud formation mimics real weather. For example, in one illustrative embodiment, when the T/DP spread is zero, the cloud formation probability 0.04 results in only a 4% chance of a cloud forming per minute (or per weather calculation cycle, or per some other amount of time). When the probability is based per minute, and the weather calculation cycle is less than one minute, then the probability may be adjusted accordingly. For example, if a weather calculation cycle for a cell occurs 20 seconds after the previous weather calculation cycle for that cell, then the probability may be divided by 3 (20 sec./60 sec.=⅓). As the T/DP spread increases, the cloud formation probability approaches zero. For example, the cloud formation probability may have a small value, such as 0.0125%, when the T/DP spread is greater than a predetermined spread, such as 50 degrees Celsius. Other probabilities may alternatively be used.

Upon determining the cloud formation probability, the weather simulation manager generates a random or pseudo-random number, collectively referred to herein as a random number, between 0 and 1. If the random number is less than the cloud formation probability, the weather simulation manager forms a cloud layer in step 205. Otherwise, the weather simulation manager continues to step 207.

Figure 4:
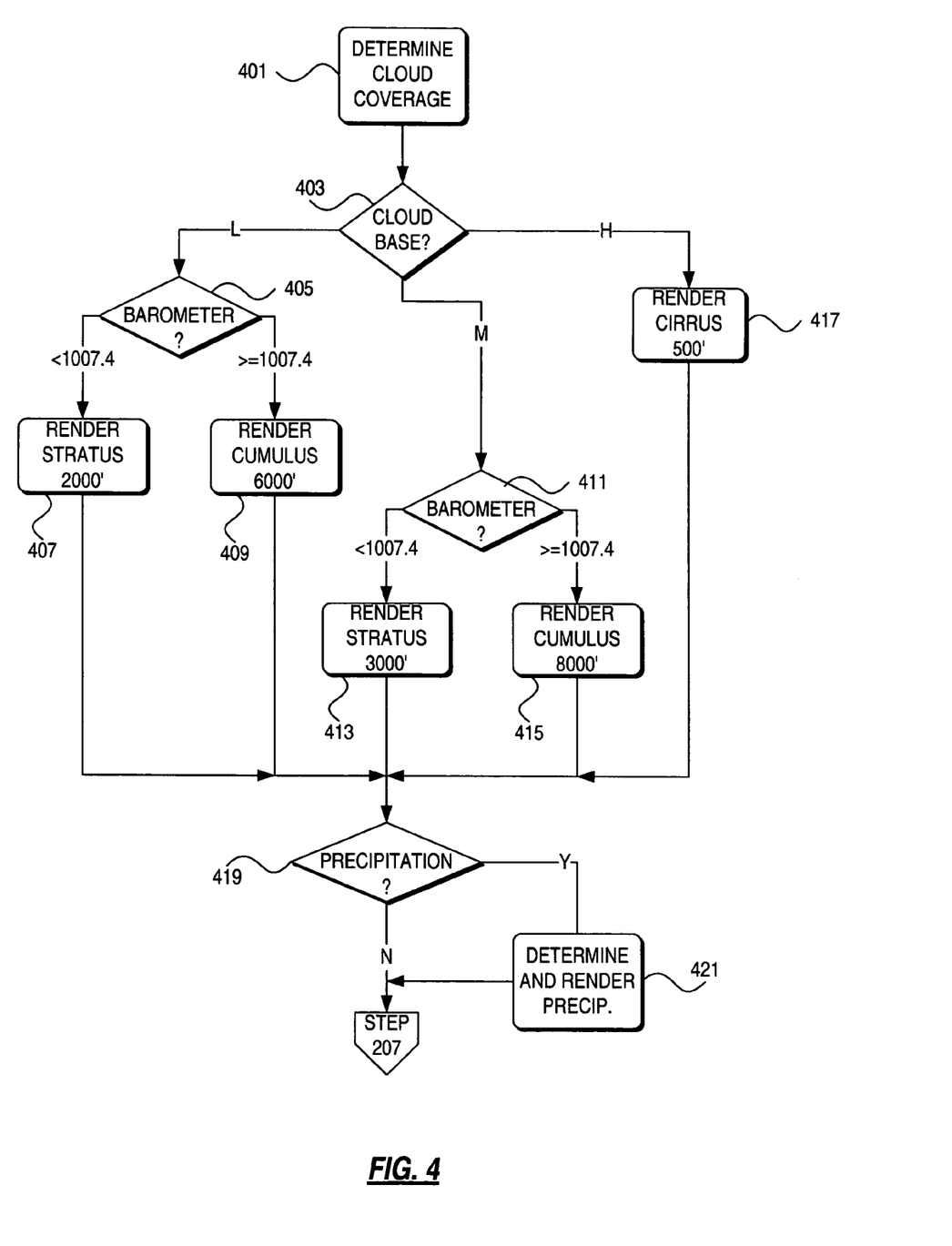
FIG. 4 illustrates a method for determining cloud formation information according to an illustrative embodiment of the invention.

In step 205, the weather simulation manager determines what type of cloud layer to form, at what base altitude, and with what height. FIG. 4 illustrates step 205 in more detail. In step 401, the weather simulation manager determines the cloud coverage with which the cloud layer should be drawn. Cloud coverage is typically determined based on the percentage of sky covered by clouds. For example, meteorologists sometimes refer to cloud coverage based on Table 1:

| Fraction of sky covered by clouds | Cloud coverage description |
|---|---|
| 0/8 | Clear/Sunny |
| ⅛–⅖ | Few Clouds/Mostly Sunny |

-continued

| Fraction of sky covered by clouds | Cloud coverage description |
|---|---|
| 3/8–4/8 | Scattered Clouds |
| 5/8–7/8 | Broken/Mostly Cloudy |
| 8/8 | Overcast |

Alternatively, cloud coverage based on tenths or some other cloud coverage basis may be used, as is known in the art.

The weather simulation manager determines cloud coverage using Equation 1:

$$CC = CF_{Act}/CF_{Max} + R_{CC} \quad \text{(Equation 1)}$$

Where CC represents cloud coverage, $CF_{Act.}$ represents the actual cloud formation probability computed in step 203, $CF_{Max.}$ represents the maximum cloud formation probability when the T/DP spread is zero, and $R_{CC}$ represents a random factor, e.g., ±50%, that may be added to CC. CC may be rounded up or down to the nearest 1/8 or other applicable fraction. The actual value of CC may be used to determine how much of the sky in the applicable cell the cloud layer should fill.

In step 403, the weather simulation manager determines the cloud layer base altitude. The cloud layer base altitude may be determined using Equation 2:

$$CBA = ((T-DP) \times 1000/2.5) + R_{CBA} \quad \text{(Equation 2)}$$

Where CBA represents Cloud Base Altitude in feet, Temperature T and Dew Point DP are in degrees Celsius, and $R_{CBA}$ is a random number such that $-300 < R_{CBA} < 300$ feet, which provides for some randomness in the cloud base altitude. Other limits for the random number $R_{CBA}$ may alternatively be used, or $R_{CBA}$ may be set at zero to provide a uniform cloud base altitude. The Cloud Base Altitude may also be adjusted so that no two cloud layers overlap by more than a predefined amount, e.g., by no more than 60%. The constant value 2.5 represents an approximation of the temperature drop per 1,000 feet increase in altitude. Other approximations may be used, e.g., based on type of weather, degrees Fahrenheit versus degrees Celsius, etc. In one embodiment, 2.5 degrees per 1,000 feet may be used. Alternatively, 4 degrees per 1,000 feet may be a more accurate approximation in hot, sunny weather, whereas 2.5 degrees per 1,000 feet may be a more accurate approximation in cloudy, humid weather.

Finally, the weather simulation manager determines whether the cloud base altitude is low, medium, or high, and proceeds to steps 405, 411, or 417, respectively. Low, medium, and high cloud base altitudes may be determined based on the relationships indicated in Equation 3:

$$\text{Low} \leq 2{,}000 \text{ meters} < \text{Medium} \leq 6{,}000 \text{ meters} < \text{High} \quad \text{(Equation 3)}$$

Other values may alternatively be used to delineate between low, medium, and high cloud based altitudes.

In step 405, the weather simulation manager checks the current barometric pressure to determine what type of clouds to draw at low altitude. If the barometer is below 1007.4 millibars, then the weather simulation manager in step 407 renders a cloud layer of stratus type clouds at the determined cloud base altitude CBA with a predetermined height and according to the determined cloud coverage CC (i.e., the cloud layer covers the fraction of the sky determined by CC). The height may be statically set, e.g., to 2,000 feet, or the height may have an element of randomness. If in step 405 the barometer is greater than or equal to 1007.4 millibars, then the weather simulation manager in step 409 renders a cloud layer of cumulus type clouds at the determined cloud base altitude CBA with a predetermined height and according to the determined cloud coverage CC. The cloud height may be statically set, e.g., to 6,000 feet, or the height may have an element of randomness. Other barometer levels may be used as well.

If in step 403 the cloud base altitude falls within the medium range, the weather simulation manager checks the barometer in step 411 to determine what type of clouds to render. If the barometer is below 1007.4 millibars, then the weather simulation manager in step 413 renders a cloud layer of stratus type clouds at the determined cloud base altitude CBA with a predetermined height and according to the determined cloud coverage CC. The cloud height may be statically set, e.g., to 3,000 feet, or the height may have an element of randomness. If in step 411 the barometer is greater than or equal to 1007.4 millibars, then the weather simulation manager in step 415 renders a cloud layer of cumulus type clouds at the determined cloud base altitude CBA with a predetermined height and according to the determined cloud coverage CC. The cloud height may be statically set, e.g., to 8,000 feet, or the height may have an element of randomness.

If in step 403 the cloud base altitude falls within the high range, the weather simulation manager in step 417 renders a cloud layer of cirrus type clouds at the determined cloud base altitude CBA with a predetermined height and according to the determined cloud coverage CC. The cloud height may be statically set, e.g., to 500 feet, or the height may have an element of randomness.

The weather simulation manager may simulate a variety of stratus, cumulus, cumulonimbus, and cirrus type clouds. The weather simulation manager may select one type to render, as applicable, based on cloud base altitude and height, e.g., cirrostratus, altostratus, nimbostratus, stratocumulus, altocumulus, cirrocumulus, cumulonimbus, and the like.

After rendering the cloud layer, the weather simulation manager determines, in step 419, whether precipitation is associated with the cloud layer. The precipitation determination may be based in whole or in part on cloud height, and on whether the temperature falls within a precipitation range, e.g., −10° C. at cloud altitude. If there is no precipitation, the weather simulation manager may continue to step 207. If there is precipitation, the weather simulation manager in step 421, determines whether the precipitation is rain, snow or some other form of precipitation (e.g., sleet, hail, etc.), and renders the applicable precipitation in the simulated geographic environment. In one embodiment, there is a 1% chance of snow and a 4% chance of rain. The precipitation may fall to the ground, or the weather simulation manager may simulate virga by simulating the precipitation falling only a predetermined distance below the cloud base, e.g., the precipitation falls for 2,000 meters below the cloud base.

In step 207 the weather simulation manager determines whether clouds should dissipate, i.e., be removed from the visually depicted scenery of the simulated environment. The weather simulation manager may determine cloud dissipation similar to the determination of cloud formation. To determine if clouds should dissipate, the weather simulation manager determines a cloud dissipation probability for cash cloud layer of the cell. Similar to the cloud formation probability, the cloud dissipation probability may vary depending on the spread between the temperature T and dew point DP. Because cloud dissipation is checked relatively often (e.g., once every ten seconds in the above example), the cloud dissipation probability is also preferably low. For example, in one illustrative embodiment, when the T/DP spread is zero, the cloud dissipation probability may be zero. As the T/DP spread increases to a high value, such as 50 degrees Celsius, the cloud formation probability approaches a maximum value, e.g., 0.04 (4%) or 0.039875 (3.9875%) chance of cloud dissipation per minute (or per weather calculation cycle). Conversely, when the T/DP spread decreases to 0, the probability approaches a minimum value, e.g., 0%. In one embodiment of the invention, in order to provide realistic cloud formation and dissipation, the cloud dissipation probability is the inverse of the cloud formation probability with respect to the maximum probability value, calculated as follows:

$$CD_{Act} = CF_{Max} - CF_{Act} \qquad \text{(Equation 4)}$$

Where $CD_{Act}$ represents the cloud dissipation probability, $CF_{Act}$ represents the actual cloud formation probability computed in step 203, and $CF_{Max}$ represents the maximum cloud formation probability when the T/DP spread is zero. For example, if the maximum formation/dissipation probability $CF_{Max}$ is 0.04 (4%) and the current cell's cloud formation probability $CF_{Act}$ is 0.025 (2.5%), then the cloud dissipation probability $CD_{Act}$ would be 0.015 (1.5%). Those of skill in the art will appreciate that variations or other formulas may be used when determining cloud dissipation probabilities. The above formula is a representative example of a preferable manner in which to calculate cloud dissipation probabilities in a realistic manner.

Upon determining the cloud dissipation probability, the weather simulation manager generates a random number between 0 and 1. If the random number is less than the cloud dissipation probability, the weather simulation manager dissipates the existing cloud layer in step 209. Otherwise, the weather simulation manager continues to step 211. If the current cell for which weather calculations are being performed has no present cloud layers, steps 207 and 209 may be skipped for that cell, and the weather simulation manager may proceed directly from step 203/205 to step 211, as applicable.

If the weather simulation manager determines that the cloud layer should dissipate, then in step 209 the weather simulation manager slowly makes the cloud layer graphically disappear from the simulated environment. In one illustrative embodiment, where each cloud is comprised of a three-dimensional volume of sprites, the weather simulation manager may gradually increase a transparency level (e.g., the A-value in an ARGB scheme) of sprites located at edges of the cloud. As the edge sprites' transparency level is increased or near transparent, the weather simulation manager may increase the transparency level of sprites closer to the center of the cloud as the farther out sprites fade from view. That is, the weather simulation manager increases the transparency level of the sprites located at the cloud's outer extremes. As those sprites begin to fade or disappear completely, the weather simulation manager begins to increase the transparency level of the next set of sprites that are now located at the cloud's outer extremes as a result of the original set of sprites fading from view and disappearing.

In step 211 the weather simulation manager updates the current weather conditions. Weather conditions may be modified based on any number of variables and in any number of manners. The method in which the weather is updated is secondary to the cloud determinations calculated based on the updated weather each calculation cycle (e.g., every 10 seconds in the above example). The weather update schema described herein is merely an example of one way in which the weather may be updated. Those of skill in the art will appreciate that alternative weather update schemas may be used instead.

During each cycle (i.e., every 10 seconds in the above example), the weather simulation manager may update the temperature and dew point, while other meteorological conditions may remain constant. Other meteorological conditions may be updated when the control program or weather simulation manager retrieves updated weather information from the database over the Internet. The rate with which the temperature and dew point change each cycle may be based on a variety of factors including, but not limited to, the position of the sun in the sky and the current cloud coverage for the respective cell. As the sun goes up during the day, the temperature and dew point generally increase, whereas as the sun goes down during the day, the temperature and dew generally decrease. Similarly, the temperature and/or dew point may be more likely to change when there is little cloud coverage than when there is greater cloud coverage. In addition, the existing T/DP spread may be used as an indication of humidity, which may further affect the rates of change for temperature and dew point. Temperature and dew point may change independently of each other while following their respective increasing/decreasing trend.

While the trend for the change may be to generally increase or generally decrease over longer periods of time, each of the temperature and dew point may increase or decrease with each cycle. For example, during an increasing trend, the range with which the temperature and/or dew point can change may include a small probability of decreasing and a larger probability of increasing. The possible range of temperature change with no cloud coverage may be from −0.01 to 0.05 degrees per minute (or per weather calculation cycle), and the weather simulation manager may randomly select a value within this range by which to alter the temperature. Thus, while there is a possibility that the temperature may decrease, there is a much larger probability that the temperature will increase. The same or a different range may be used for the dew point and opposite ranges or other ranges weighted towards decreasing values may be used when the temperature and/or dew point trend is to decrease.

Figure 5:
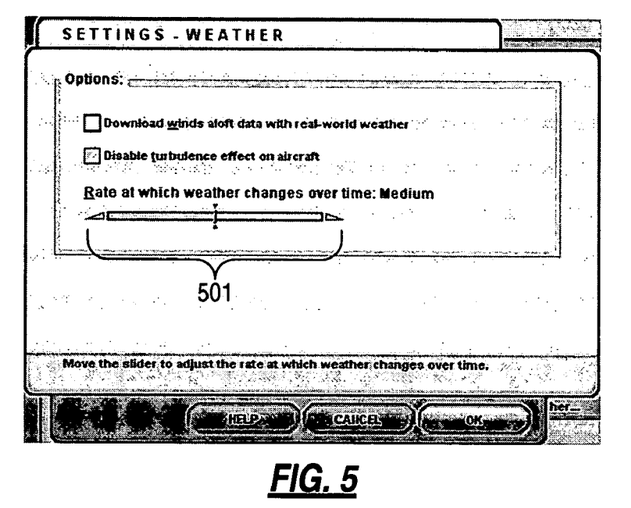
FIG. 5 illustrates a dynamic weather settings menu according to an illustrative embodiment of the invention.

As indicated above, the temperature and dew point changes may be based on the sun's position in the sky as well as on cloud coverage. Temperature and/or dew point changes may further be based on a 'reality' setting that alters the changes based on whether the changes should attempt to mimic real weather, be more extreme than real weather, or be milder than real weather. In one illustrative embodiment, with reference to FIG. 5, a user may set a dynamic weather variable 501 (e.g, a slider) to any of a plurality of positions, e.g., none, mild, medium, high, extreme. A default value may be set to the 'medium' setting, which attempts to mimic actual rates of change of real weather patterns. The mild setting may cause the rate of change to be less than real weather, and the none setting may cause temperature and dew point to remain constant throughout game play. The high setting may cause the rate of change to be more than real weather, and the extreme setting may cause rates of change to be a lot more than real weather (e.g., variations of 40 degrees Celsius per day).

The selected setting may act as a multiplier for the temperature and/or dew point change. For example, the none setting may multiply the temperature and/or dew point change by 0, resulting in no change; the mild setting may multiple the temperature and/or dew point change by 0.5, resulting in less change than real weather; the medium setting may multiple the temperature and/or dew point change by 1, resulting in real weather; the high setting may multiply the temperature and/or dew point change by 3, resulting in greater than normal temperature and dew point variations; and the extreme setting may multiply the temperature and/or dew point change by 10, resulting in extreme temperature and dew point variations as compared to real life. Alternatively, additional or different settings may be used, or the user may select any arbitrary multiplier within the range of valid multipliers.

When updating the weather in step 211, the weather simulation manager may perform one or more error checks including, but not limited to, ensuring that the dew point does not exceed the temperature. That is, the dew point should be lower than or the same as the temperature. If the weather simulation manager otherwise attempts to change the temperature and/or dew point in such a manner that the dew point would exceed the temperature, the weather simulation manager forces the dew point and temperature to the same value (e.g., either the calculated temperature or dew point, or some range in between), or forces the dew point to be less than the temperature. In addition, the weather simulation manager may ensure that the temperature, at ground level never exceeds or falls below a certain temperature range. For example, the weather simulation manager may ensure that the temperature T at ground level stays within the range $-50°$ C.$\leq$T$\leq$50° C.

If the user, prior to beginning game play or dynamically in the middle of game play, selects updated Real-world weather 609 (FIG. 6), the weather simulation manager may retrieve updated real world weather conditions from the database over the Internet at regular intervals, e.g., every 15 minutes. The regular intervals in which weather is retrieved from the database are generally much larger than the cycle intervals in which the weather simulation manager updates weather for each cell (e.g., approximately every 10 seconds in the above example). Therefore, there is a likelihood that the simulated weather will be quite different from the real-world weather by the time the next real world weather update occurs. This is especially the case when the user's dynamic weather setting 501 (FIG. 5), 611 (FIG. 6) is set to other than the medium setting.

Thus, in one embodiment, upon retrieving updated real world weather, the weather simulation manager may revert the weather back to real world weather. However, to provide a smooth user experience during game play, the weather simulation manager might not immediately change the current weather for each cell to the updated real world weather. To do so might cause unrealistic weather events and/or confuse the user. Instead, the weather simulation manager may gradually morph each cell's current weather to the retrieved updated real world weather over some predetermined amount of time, e.g., over the next three minutes of game play. This provides a smooth transition back to real weather. After the transition back to real weather, the weather simulation manager may revert back to the user settings to determine subsequent weather changes during each cycle.

In some embodiments, the weather simulation manager might not simulate weather conditions other than temperature and dew point. That is, the weather simulation manager, during each cycle, might not alter other weather conditions such as winds aloft and barometric pressure. Instead, these other weather conditions may be updated at the periodic intervals in which weather is retrieved from the database over the Internet.

Thus, using the methods and systems described above, the weather simulation manager can provide dynamic weather based on real weather, based a user's individual weather settings, or any combination thereof. The weather simulation manager can simulate real world weather, making the user feel part of a larger world, or weather that changes more or less dramatically than real world weather. By independently simulating weather for each cell in a geographic grid, a variety of weather types may be simulated simultaneously, further increasing the realistic look and feel of the simulated weather.

While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

I claim:

1. A method for altering cloud formations in a computer game, comprising:
   determining a temperature and a dew point;
   generating a random number and, when the random number is within a determined probability of cloud formation based at least in part on a spread of the temperature and dew point, rendering a cloud on a display screen during a game play mode of the computer game.

2. The method of claim 1, further comprising:
   generating a second random number and, when the second random number is within a determined probability of cloud dissipation based at least in part on the spread of the temperature and dew point, dissipating a rendered cloud on the display screen during a game play mode of the computer game.

3. The method of claim 1, further comprising repeating the determining and generating steps for each cell in a geographical grid substantially centered around a user's current position in a simulated environment of the computer game.

4. The method of claim 2, wherein dissipating a rendered cloud further comprises:
   gradually increasing a transparency level at edges of the cloud; and
   iteratively increasing a transparency level closer to a center of the cloud as the farther out portions of the cloud fade from view due to its increased transparency level.

5. The method of claim 1, wherein determining the temperature and dew point comprises:
   receiving the temperature and dew point at intervals from a database over the Internet;
   altering the temperature and dew point between the intervals based at least in part on a position of a sun in the simulated environment being simulated by the computer game; and
   returning the altered temperature over a predetermined period of time to the temperature and dew point received at the next interval.

6. The method of claim 5, wherein the altering step is further based at least in part on a user weather setting.

7. The method of claim 6, wherein the user weather setting comprises a multiplier.

8. The method of claim 1, wherein rendering a cloud further comprises:
    determining a cloud base altitude based at least in part on the spread of the temperature and dew point; and
    determining a cloud type based at least in part on an atmospheric pressure.

9. One or more computer readable media storing computer executable instructions which, when executed, perform a method for altering cloud formations in a computer simulation, said method comprising:
    determining a temperature and a dew point;
    generating a random number and, when the random number is within a determined probability of cloud formation based at least in part on a spread of the temperature and dew point, rendering a cloud on a display screen during a game play mode of the computer simulation.

10. The computer readable media of claim 9, the method further comprising:
    generating a second random number and, when the second random number is within a determined probability of cloud dissipation based at least in part on the spread of the temperature and dew point, dissipating a rendered cloud on the display screen during a game play mode of the computer simulation.

11. The computer readable media of claim 10, wherein dissipating a rendered cloud further comprises:
    gradually increasing a transparency level at edges of the cloud; and
    iteratively increasing a transparency level closer to a center of the cloud as the farther out portions of the cloud fade from view due to its increased transparency level.

12. The computer readable media of claim 9, the method further comprising repeating the determining and generating steps for each cell in a geographical grid substantially centered around a user's current position in a simulated environment of the computer simulation.

13. The computer readable media of claim 9, wherein determining the temperature and dew point comprises:
    receiving the temperature and dew point at intervals from a database over the Internet;
    altering the temperature and dew point between the intervals based at least in part on a position of a sun in the simulated environment being simulated by the computer simulation; and
    returning the altered temperature over a predetermined period of time to the temperature and dew point received at the next interval.

14. The computer readable media of claim 13, wherein the altering step is further based at least in part on a user weather setting.

15. The computer readable media of claim 14, wherein the user weather setting comprises a multiplier.

16. The computer readable media of claim 9, wherein rendering a cloud further comprises:
    determining a cloud base altitude based at least in part on the spread of the temperature and dew point; and
    determining a cloud type based at least in part on an atmospheric pressure.

17. A computer system, comprising:
    a processor controlling overall operation of the computer system;
    memory storing computer executable instructions which, when executed by the processor, perform a method for altering cloud formations in a computer simulation, said method comprising:
    determining a temperature and a dew point;
    generating a random number and, when the random number is within a determined probability of cloud formation based at least in part on a spread of the temperature and dew point, rendering a cloud on a display screen during a game play mode of the computer simulation.

18. The computer system of claim 17, the method further comprising:
    generating a second random number and, when the second random number is within a determined probability of cloud dissipation based at least in part on the spread of the temperature and dew point, dissipating a rendered cloud on the display screen during a game play mode of the computer simulation.

19. The computer system of claim 18, wherein dissipating a rendered cloud further comprises:
    gradually increasing a transparency level at edges of the cloud; and
    iteratively increasing a transparency level closer to a center of the cloud as the farther out portions of the cloud fade from view due to its increased transparency level.

20. The computer system of claim 17, the method further comprising repeating the determining and generating steps for each cell in a geographical grid substantially centered around a user's current position in a simulated environment of the computer simulation.

21. The computer system of claim 17, further comprising a network interface, and wherein determining the temperature and dew point further comprises:
    receiving the temperature and dew point at intervals from a database over the Internet via the network interface;
    altering the temperature and dew point between the intervals based at least in part on a position of a sun in the simulated environment being simulated by the computer simulation; and
    returning the altered temperature over a predetermined period of time to the temperature and dew point received at the next interval.

22. The computer system of claim 21, wherein the altering step is further based at least in part on a user weather setting.

23. The computer system of claim 22, wherein the user weather setting comprises a multiplier.

24. The computer system of claim 17, wherein rendering a cloud further comprises:
    determining a cloud base altitude based at least in part on the spread of the temperature and dew point; and
    determining a cloud type based at least in part on an atmospheric pressure.

* * * * *